United States Patent [19]

Muller

[11] 4,368,033
[45] Jan. 11, 1983

[54] APPARATUS AND METHOD FOR ADJUSTING PALLET-MOUNTED SAGGERS

[75] Inventor: Walter Muller, Krumbach, Fed. Rep. of Germany

[73] Assignee: Lingl Corporation, Paris, Tenn.

[21] Appl. No.: 267,339

[22] Filed: May 26, 1981

[30] Foreign Application Priority Data

May 27, 1980 [DE] Fed. Rep. of Germany ....... 3020120

[51] Int. Cl.³ .......................... F21C 9/00; F27D 5/00; B65G 47/26
[52] U.S. Cl. ....................................... 432/6; 198/459; 432/11; 432/239
[58] Field of Search .......................... 432/5, 6, 11, 239; 198/459

[56] References Cited

U.S. PATENT DOCUMENTS

| 2,583,968 | 1/1952 | Rosseau | 432/11 |
| 2,740,351 | 4/1956 | Anderson | 198/459 |
| 3,297,135 | 1/1967 | Piroutek | 198/459 |

*Primary Examiner*—John J. Camby
*Attorney, Agent, or Firm*—Cushman, Darby & Cushman

[57] ABSTRACT

Appropriately spaced aligning pins are engaged with respectively corresponding portions of each of plural saggers disposed on a pallet. The pallet and aligning pins are then moved relative to one another so as to accurately and substantially simultaneously space apart the plural saggers on the pallet prior to firing.

12 Claims, 3 Drawing Figures

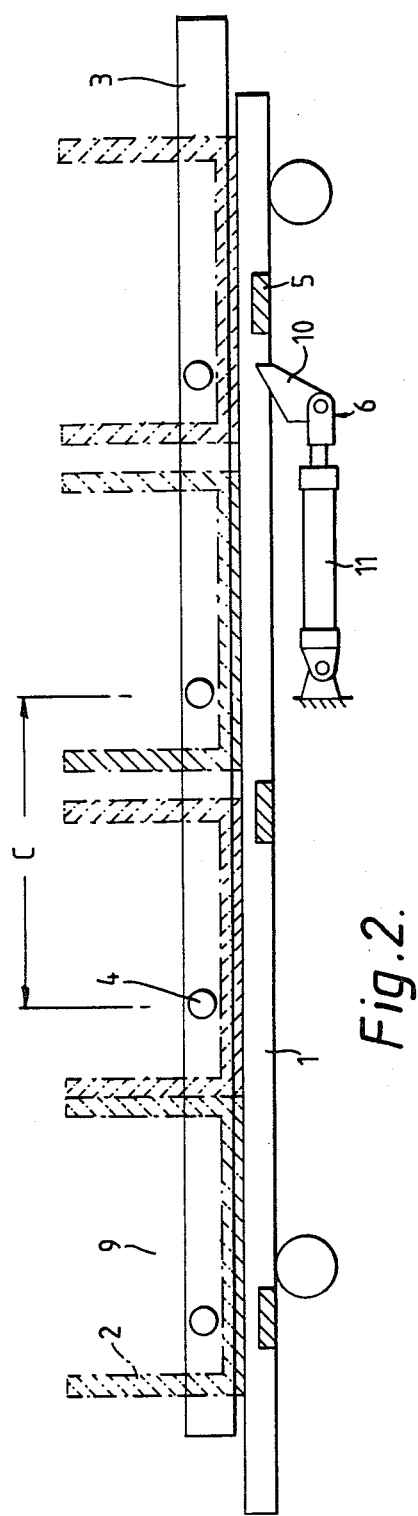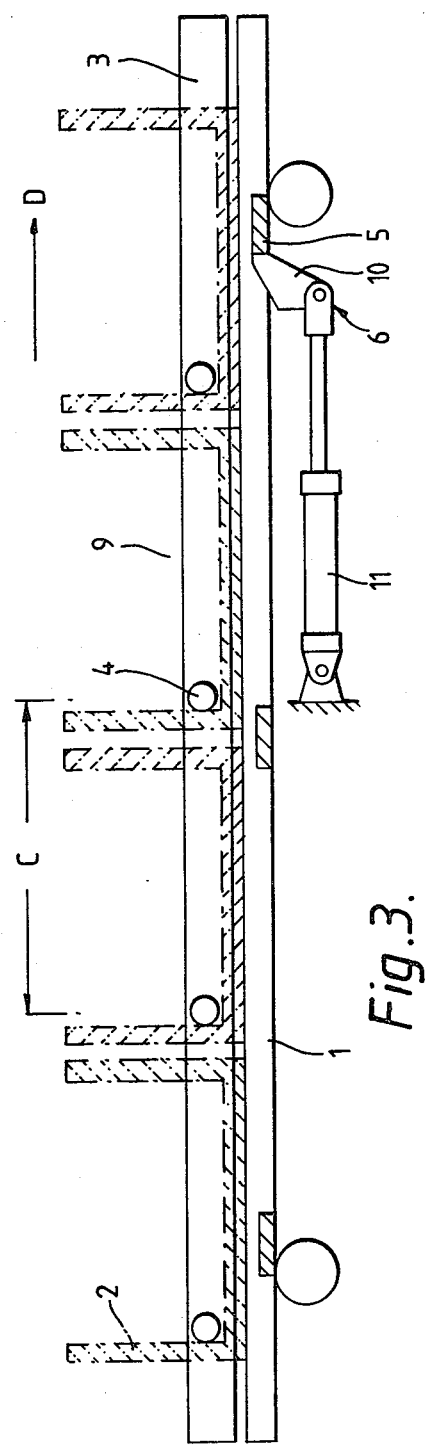

APPARATUS AND METHOD FOR ADJUSTING PALLET-MOUNTED SAGGERS

The invention relates to an apparatus and method for the rapid and accurate common adjustment of pallet-mounted (preferably channel-section) saggers to position the same at predetermined intervals from one another on the pallet.

Saggers (firing boxes made of fire clay in which delicate ceramic pieces are placed while being fired) are removed in rows from kiln cars and placed on pallets; after the saggers have been unloaded and loaded again with more ceramic ware to be fired (e.g. with roof tiles), they are removed from the pallets and returned to the kiln cars one above another (see German Offenlegungsschrift No. 27 05 074) dated 1977. However, the saggers must be accurately aligned, otherwise they may collapse.

German Offenlegungsschrift No. 28 15 239 dated 1979 discloses method and apparatus for adjusting pallet-mounted saggers wherein each sagger is removed individually from the pallet and adjusted in position by a photo-electric control system. A light sensitive device is positioned at an interval from a previously adjusted sagger in such a way that one light beam passes unobstructedly through the interval or gap between saggers and another light beam is just interrupted by the front end of the sagger when in proper position for lowering onto the pallet.

A disadvantage of this known prior system is that each sagger must be individually lifted off its pallet and individually adjusted (by movement of the lifting device). Thus, this lifting device is required to make rapid accelerations and decelerations, and, even then, its net output is relatively low. Another disadvantage is that many separate movements and control steps are necessary merely to adjust and complete the loading of saggers on one pallet. Yet another disadvantage is that the saggers are not adjusted against fixed abutments, so that the accuracy of adjustment depends upon the long-term reliability of the photo-electric control and individual mechanical positioning.

However, the present invention provides method and apparatus for adjusting pallet-mounted saggers such that a complete charge of saggers on a given pallet can be adjusted in a single step, the apparatus remaining very simple while adjustment requires a reduced number of movements and is carried out using fixed abutments without elaborate control facilities.

The exemplary presently preferred embodiment of the invention includes aligning bars along the two major (elongated) sides of the pallet which bars can be moved into operative position along the major sides of the saggers on the pallet while leaving a small clearance to permit relative movement of the saggers. Pins are disposed on the aligning bars and extend for a short distance into the charging area of the saggers when the aligning bars are moved into operative position. The intervals between pins on each of the aligning bars corresponds to the desired predetermined positioning intervals of the saggers. Then, as an advancing device moves the pallet into a defined position, the pins are relatively moved towards the saggers so as to engage them and position them at their desired predetermined intervals of the saggers.

With this invention, a complete charge of saggers on a pallet can be adjusted in a single step, so that even if speeds of mechanical parts are low, plural saggers are simultaneously aligned in relation to one another as a whole in relation to the pallet. The relative alignment between saggers is the result of the predetermined spacing intervals between pins on the aligning bars and the relative movement of the pallet with respect to the aligning bars. Thus a reduced number of movement sequences are required and sagger alignment is made against fixed abutments and therefore very reliable.

An exemplary embodiment of the invention is shown in the accompanying drawings in which:

FIG. 2 is a side view of the exemplary apparatus with a pallet in the adjusting position prior to the adjusting step, and FIG. 3 is a view similar to FIG. 2 but after completion of the adjusting step.

Figure 1:
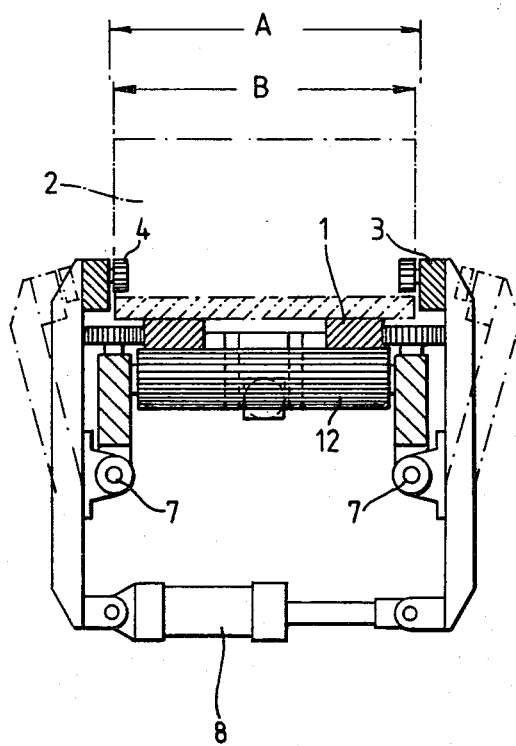
FIG. 1 is a section through the exemplary apparatus.

Saggers 2 on pallets 1 are conveyed on a conveying path or track 12 (in a manner not shown) into a position between initially opened aligning bars 3 (shown in dashed line at FIG. 1) whose length corresponds substantially to the length of a pallet 1. By means of an actuating cylinder 8 the bars 3, which are adapted to pivot around a pivot 7 parallel to the length of the pallet 1, are moved towards one another from the open position so that the interval A between the bars 3 is slightly greater than the width B of the saggers 2—i.e., the bars 3 move up close to the saggers 2. The bars 3 have pins 4 which extend a short distance into charging area 9 of saggers 2 and whose spacing C from one another corresponds to the required spacing or interval between the saggers 2 on the pallet 1.

The pallet 1 has bottom cross-members 5 which are engaged by an actuator 6 comprising an abutment 10 and cylinder 11, the device 6 so moving the pallet 1 in the direction D into a defined position that the saggers 2 are drawn back by the relatively fixed pins 4 and aligned thereby on the pallet 1. In other words, the pallet and alignment bar(s) are moved relative to one another such that pins 4 engage the saggers and move them along the pallets as required to effect the desired spacing. It is preferred for the operation of the exemplary apparatus that the pallets 1 have cross-members 5, however the abutment 10 could also be arranged to engage with an end face of a pallet 1 and other equivalent arrangements might also be devices.

Although only one exemplary embodiment has been explained in detail, those skilled in the art will recognize that various modifications and variations can be made in the exemplary embodiment while still retaining its novel advantageous features. All such modifications and variations are intended to be included within the scope of the appended claims.

What is claimed is:

1. An apparatus for the common adjustment of pallet-mounted saggers to position them at predetermined intervals from one another on a common pallet, said apparatus comprising:

aligning bars disposed for positioning along two opposing sides of the pallet and for positioning near corresponding opposing sides of the saggers on the pallet, plural pins disposed on the aligning bars and simultaneously extending into respective charging areas of corresponding saggers when positioned near thereto, the spaced intervals between pins on each of the aligning bars corresponding to the desired predetermined positioning intervals of the saggers, an advancing means for moving the pallet relative to said pins while the pins are continuously extended into said charging areas such that the saggers are thereby positioned at said predetermined intervals on said pallet.

2. An apparatus according to claim 1, wherein the length of the aligning bars corresponds to the length of the pallets.

3. An apparatus according to claim 1 or 2, wherein the aligning bars are disposed along a conveyor carrying the pallets, each such bar being pivotable by actuating cylinders, around a pivot parallel to the said two opposing sides of the pallet, from an open position into a closed position near the saggers.

4. An apparatus according to claim 1 or 2 wherein the advancing means comprises an advancing cylinder having one end fixed relative to said pins and which carries a relatively movable abutment on its opposite end for engagement with a predetermined portion of said pallet and which is disposed below a conveyor carrying the pallet.

5. An apparatus according to claim 4 including a pallet and wherein said pallet includes a bottom crossmember and said abutment engages said bottom crossmember of the pallet.

6. Apparatus for adjusting the relative positions of plural saggers disposed in-line on a common pallet, said apparatus comprising:
   plural members spaced apart from one another at intervals corresponding to the desired spacing intervals between respectively corresponding ones of said saggers, said members being relatively fixed with respect to each other,
   positioning means for positioning said members into simultaneous respective engagement paths with their respectively associated saggers when position adjustment thereof is desired, and
   movement means for producing relative movement between said common pallet and said members while said members are continuously positioned into said positive engagement paths whereby said members are caused to engage their respectively associated saggers and substantially simultaneously adjust them on said pallet into a desired spaced relationship.

7. Apparatus as in claim 6 wherein said plural members comprise:
   two parallel bars disposed for positioning on opposing sides of said pallet; and
   plural pins mounted in spaced-apart relationship on each of said bars.

8. Apparatus as in claim 7 wherein said positioning means comprises:
   at least one lever arm for each of said bars, each lever arm being pivoted along an axis parallel to its associated bar and attached to that bar at a predetermined distance from said axis; and
   at least one extendable cylinder attached to mechanically rotate said lever arms about its respective axis.

9. Apparatus as in claim 6, 7 or 8 wherein said movement means includes at least one extendable cylinder disposed to selectively engage said pallet and to move it with respect to said members.

10. Apparatus as in claim 6, 7 or 8 further comprising a conveyor for carrying said pallet into operative position with said plural members and said movement means.

11. Apparatus as in claim 9 further comprising a conveyor for carrying said pallet into operative position with said plural members and said movement means.

12. Method for adjusting the relative positions of plural saggers disposed in-line on a common pallet, said method comprising:
   positioning plural members spaced apart from one another at predetermined intervals into simultaneous positive engagement paths with respectively corresponding ones of said saggers, said members being relatively fixed with respect to each other; and
   producing relative movement between said common pallet and said members while they are continuously positioned into said positive engagement paths whereby said members are caused to engage their respectively associated saggers and substantially simultaneously adjust them on said pallet into a desired spaced relationship.

* * * * *